Patented July 1, 1930

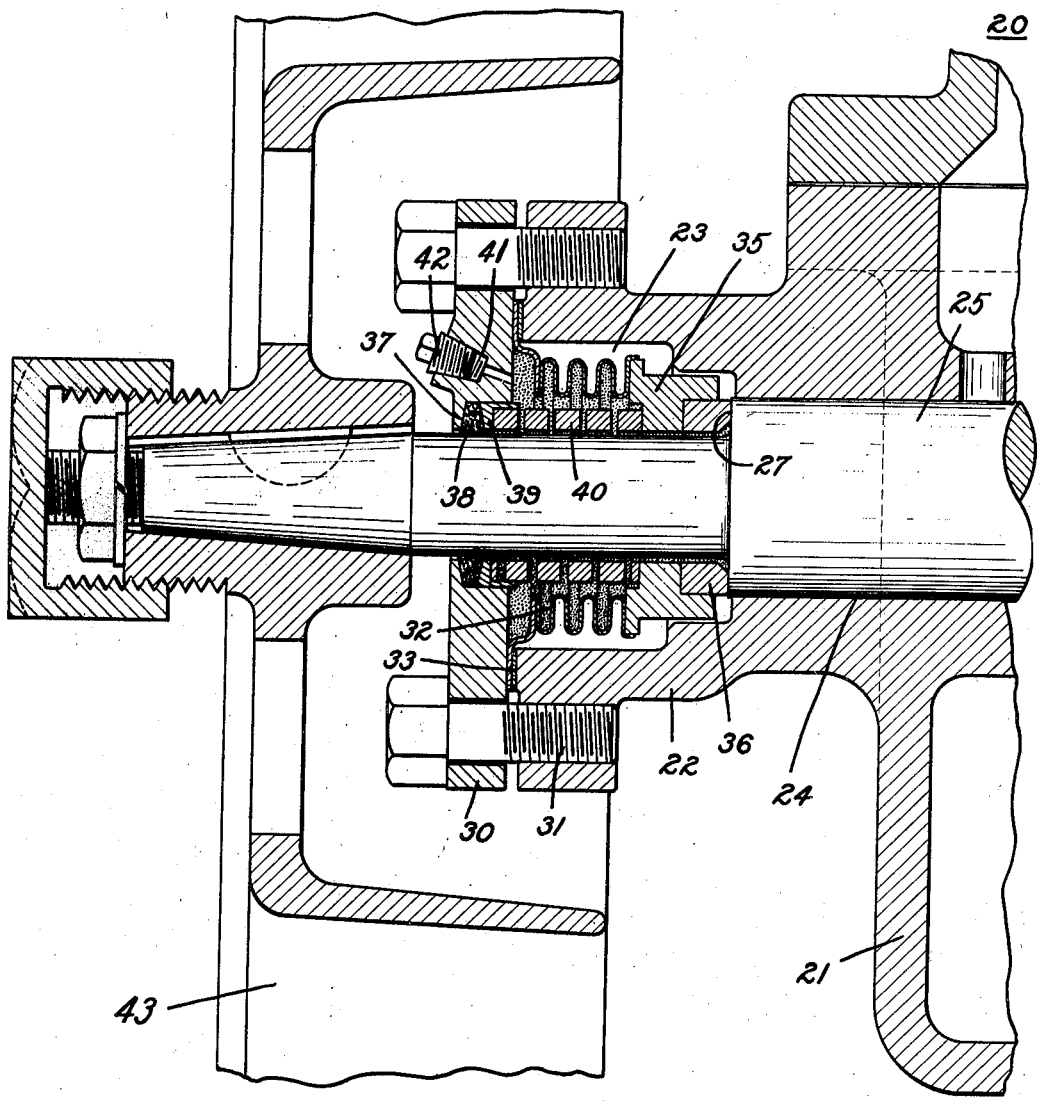

1,768,606

UNITED STATES PATENT OFFICE

LESTER S. KEILHOLTZ AND CLARENCE WARNER, OF DAYTON, OHIO, ASSIGNORS, BY MESNE ASSIGNMENTS, TO FRIGIDAIRE CORPORATION, A CORPORATION OF DELAWARE

REFRIGERATING APPARATUS

Application filed October 3, 1923. Serial No. 666,240.

The present invention relates to sealing of drive shafts of apparatus containing a fluid under pressure either above or sub-atmospheric.

One form of the present invention is an improvement over the sealing means for drive shafts in the copending application of Harry B. Hull and Clarence Warner, Serial No. 664,827, filed September 26, 1923.

Other and further objects and advantages of the present invention will be apparent from the following description, reference being had to the accompanying drawings, wherein a preferred embodiment of one form of the present invention is clearly shown.

In the drawings there is shown a fragmentary sectional view of a compressor and of the improved sealing means.

Referring to the drawings, 20 is the crank case of a compressor having a wall 21 which merges into a flange 22 forming a recess 23. The wall 21 forms a bearing 24 in which there is journalled a shaft 25 which forms the crank shaft of the compressor. Shaft 25 extends through the recess 23. The shaft 25 is provided with a ground surface shoulder; this shoulder is located within the recess 23. A cover plate 30 is provided for the recess 23 and is held in place by bolts 31. A longitudinally expansible circumferentially corrugated and transversely flexible metal member commonly called a metal bellows 32 is located next to the cover plate 30 and projects within the recess 23 and is held in place by being clamped between the flange 22 and cover 30, there being a gasket 33 interposed between the bellows 32 and flange 22 for sealing same at this place. A collar 35 is secured, as by solder to the metal bellows 32 and carries a ring 36 the face of which is ground and is adapted to engage the ground surface of shoulder 27 of shaft 25. The bellows 32, collar 35, and ring 36, are formed concentrically with the shaft 25. The cover plate 30 is bored to form a shoulder 37 and a recess, in which recess there is located a packing 38 interposed between the shoulder 37 and a packing gland 39. A spring 40 is interposed between the gland 39 and the collar 35 and is adapted to hold the ground surface of the ring 36 in engagement with the ground surface of shoulder 27 and shaft 25 while at the same time it forces the shaft 25 endwise to prevent end play of the shaft. Also said spring forces the gland 39 against the packing 38 so as to force the packing against the shaft 25. The cover plate 30 is provided with a filler opening 41 which leads into the interior of the metal bellows 32 and through which grease, lubricant, or any other suitable lubricating or sealing ingredient may be inserted the bellows therefor serving as a lubricant retainer or container. The bellows substantially filled with the ingredient and the filler opening is closed by a plug 42.

The present invention is particularly applicable to compressors for refrigerating systems such as described in the copending application of Harry B. Hull, Serial No. 675,006, filed November 15, 1923, in which the shaft 25 is driven by a flywheel 43.

In refrigerating compressors of this type the crank case thereof, contains a gaseous refrigerant and at certain times there is a vacuum and at other times there is a pressure within the crank case. The present invention provides a compact structure including a double seal which prevents an ingress of air when a vacuum is present within the crank case and prevents an egress from the crank case when there is a pressure above atmospheric within said crank case. The ground surface of the ring 36 and the ground surface of shoulder 27 on the shaft 25 and the metal bellows 32 normally prevents any gas which escapes from the crank case along the bearing 24 from escaping along that portion of the shaft 25 beyond the ground surface of shoulder 27. Should any gas escape beyond ground surfaces and through said bellows the ingredient between said metal bellows and shaft 25 and the packing 38 will prevent the escape of gas to the atmosphere. The reverse is true in preventing air from leaking from the atmosphere into the crank case. It is likewise apparent that the sealing ingredient used in the bellows should preferably be a lubricant since it may find its way between the sealing surfaces and thus aid in reducing the friction between the coacting surfaces. The packing 38, the shaft 25 and the ground surfaces are all maintained in their correct positions by one member, namely the spring 40.

While the form of mechanism herein shown and described constitutes a preferred embodiment of one form of the invention, it is to be understood that other forms might be adopted and various changes and alterations made in shape, size, and proportion of the element therein without departing from the spirit and scope of the invention.

What is claimed is as follows:

1. A sealing device for a rotating shaft comprising in combination a plurality of coacting sealing members, axially extensible bellows connected with one of said members, said axially extensible bellows providing a hollow chamber between said shaft and bellows and a sealing medium in said chamber.

2. A sealing device for a rotating shaft comprising in combination a plurality of coacting sealing members, axially extensible bellows connected with one of said members, said axially extensible means providing a hollow chamber between said shaft and bellows, a medium in said chamber adapted to act as a seal and a lubricant and means for admitting said medium into said chamber.

3. A sealing device for a rotating shaft comprising in combination, a casing, a shaft extending through a wall in said casing and having a shoulder, a sealing member including a sealing ring surrounding the shaft and engaging said shoulder, a packing member including a plate surrounding the shaft and spaced from the sealing member, a bellows connecting the sealing member and the plate of the packing member so as to provide a closed chamber about a portion of the shaft, a sealing compound within said chamber, and means provided on the packing member plate for introducing the sealing compound into the closed chamber.

4. A sealing device for a rotating shaft comprising in combination, a casing, a shaft extending through a wall of said casing and having a shoulder, a sealing member surrounding said shaft and engaging said shoulder, a packing member provided about the shaft spaced from the sealing member, a bellows connecting the sealing member and said casing so as to provide a closed chamber about a portion of the shaft, and a spring within said chamber engaging said packing member and urging it against said shaft.

5. A sealing device for a rotating shaft comprising in combination, a casing, a shaft extending through a wall of said casing and having a shoulder, a sealing member surrounding said shaft and engaging said shoulder, a packing member provided about the shaft spaced from the sealing member, a bellows connecting the sealing member and said casing so as to provide a closed chamber about a portion of the shaft, and a spring within said chamber engaging said packing member and urging it against said shaft and also urging said sealing member against said shoulder.

6. A sealing device for a rotating shaft comprising in combination, a casing, a shaft extending through a wall of said casing and having a shoulder, a sealing member surrounding said shaft and engaging said shoulder, a packing member provided about the shaft spaced from the sealing member, a bellows connecting the sealing member and said casing so as to provide a closed chamber about a portion of the shaft, and a spring within said chamber engaging said packing member and urging it against said shaft and also urging said sealing member against said shoulder, and means for introducing a compound within said chamber after assembly of said device.

In testimony whereof we hereto affix our signatures.

LESTER S. KEILHOLTZ.
CLARENCE WARNER.